Figure 4:
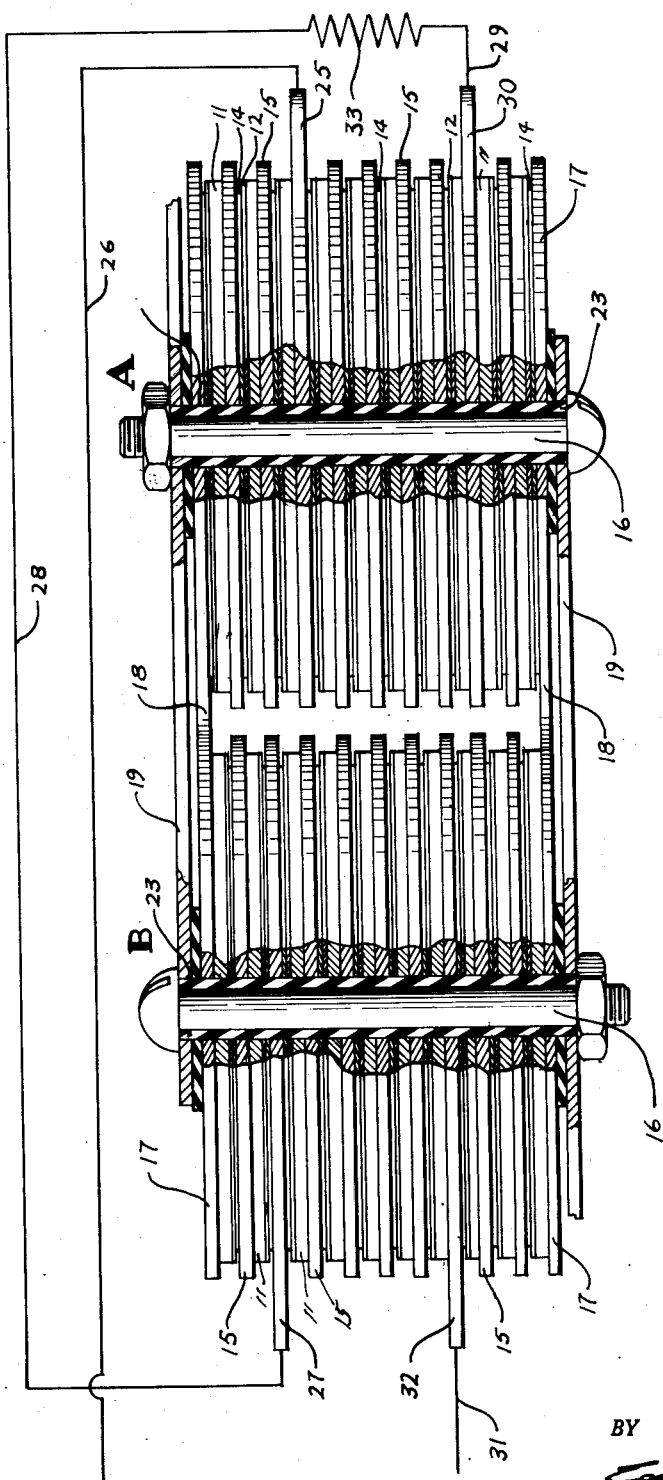

Oct. 16, 1951 G. H. LELAND 2,571,588
ALTERNATING CURRENT RECTIFIER OF THE SELENIUM TYPE
Filed Oct. 14, 1947 2 SHEETS—SHEET 1
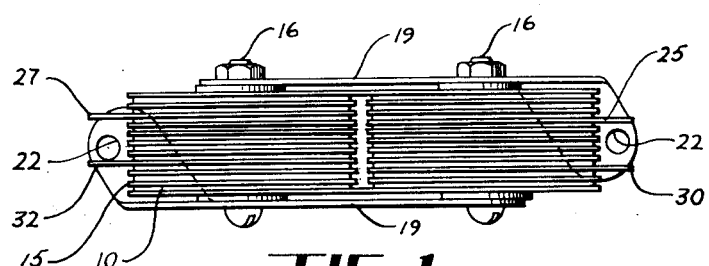
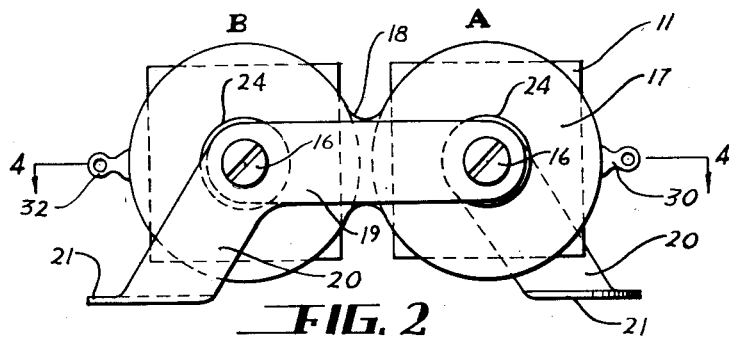
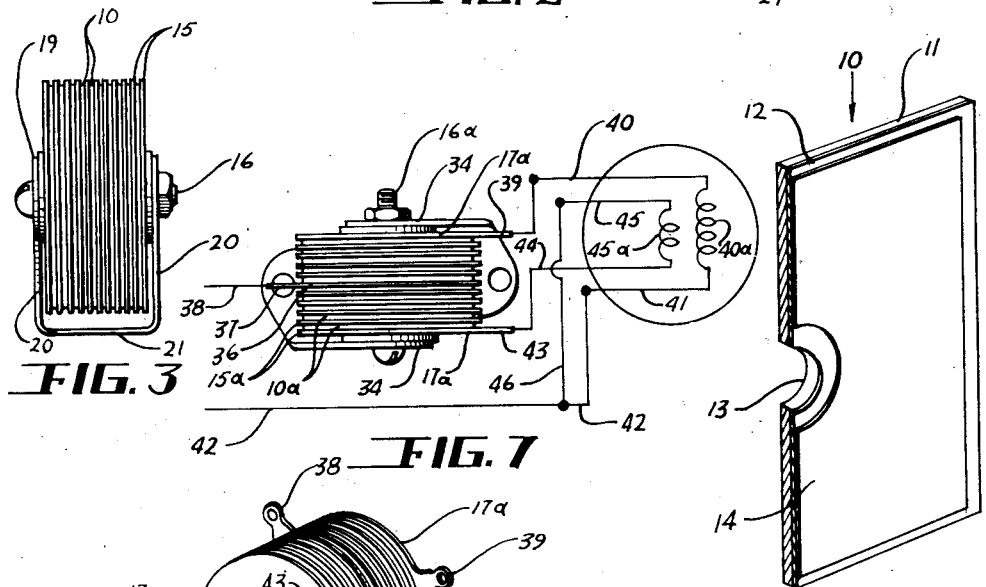
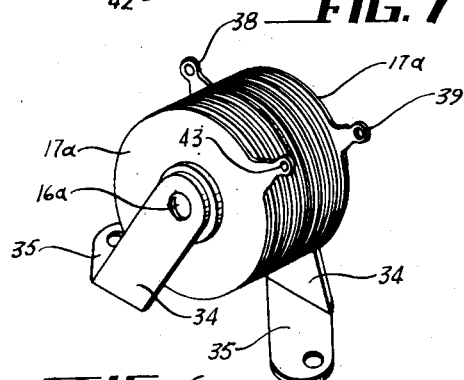
INVENTOR.
GEORGE H LELAND
BY
ATTORNEY

INVENTOR.
GEORGE H. LELAND
BY
ATTORNEY

Patented Oct. 16, 1951

2,571,588

UNITED STATES PATENT OFFICE 2,571,588

ALTERNATING-CURRENT RECTIFIER OF THE SELENIUM TYPE

George H. Leland, Dayton, Ohio

Application October 14, 1947, Serial No. 779,740

3 Claims. (Cl. 175—366)

This invention relates to an alternating current rectifier of the selenium type.

One object of the invention is to provide a rectifier in which the heating of the rectifier cells is so controlled that the rectifier will operate continuously for a relatively long time without overheating the cells.

A further object of the invention is to provide such a rectifier of a compact construction which can be mounted in a small space.

A further object of the invention is to provide a rectifier comprising a small number of parts which can be produced and assembled at low cost.

A further object of the invention is to provide such a rectifier with a supporting device which does not appreciably increase the over all size of the rectifier.

Other objects of the invention may appear as the device is described in detail.

In the accompanying drawings, Fig. 1 is a top plan view of a rectifier embodying my invention; Fig. 2 is a side elevation of the same; Fig. 3 is an end elevation of the same; Fig. 4 is an enlarged section taken on the line 4—4 of Fig. 2; Fig. 5 is a section of one-half of a rectifier cell on a greatly enlarged scale; Fig. 6 is a perspective view of a modified form of the rectifier; and Fig. 7 is a top plan view of the rectifier of Fig. 6 and including the circuit connections therefor.

In these drawings I have illustrated two embodiments of my invention one of which is a bridge type rectifier comprising two stacks of cells and the other of which comprises a single stack of cells. It is to be understood, however, that the number and arrangement of the stacks and of the cells in the stacks may vary and that the rectifier was a whole, as well as the several parts thereof, may take various forms without departing from the spirit of the invention.

A rectifier of the selenium type comprises a plurality of rectifier cells which are usually arranged in the form of a stack and provided with means whereby the stack may be connected with an alternating current supply line and with a direct current load circuit. The cells are of such a character that each cell will permit the flow of current through the same in one direction and will prevent or substantially prevent the flow of current in the other direction. Such a cell may take various forms but usually it comprises a plate of conducting material coated with a substance which will prevent the flow of current therethrough in one direction. The cell here shown is of a known construction and as illustrated in Fig. 5 the cell 10 comprises a plate 11 of conducting material, usually aluminum or steel, one side of which is provided with a coating 12 of material, such as selenium, which will permit the free flow of current from the plate through the coating, but will prevent, or substantially prevent, the flow of current through the coating to the plate, the device thus functioning in the manner of a check valve. The cell may take various forms and is here shown of a well known form in which the cell is square and is provided with a central opening 13 to receive a connecting device for securing the several cells one to the other. Usually there is superposed on the coating 12 a second coating 14 of conducting material, this second coating being preferably of an area slightly smaller than the area of the surface of the other coating 12 and in the present instance the coating 14 is spaced from the marginal edges of the plate and from the central opening 13 of the latter.

In the form shown in Figs. 1 to 5 the rectifier comprises two stacks of cells, A and B, each stack including a plurality of cells and the cells of the two stacks being electrically connected one with the other. The flow of current through the cell generates heat in the cell and if this heat becomes excessive the efficiency of the cell is decreased and the cell may be destroyed. For the purpose of so controlling the heat of the cells as to permit current to flow through the rectifier continuously for relatively long periods there is interposed between adjacent cells in each stack elements which will receive heat from the cells and store the same in such a manner as to retard the heating of the cells and thus prevent overheating for substantial periods of time. In the preferred construction each storage element comprises a relatively thick plate 15 of conducting material, such as aluminum or steel, and is interposed between and in contact with the surfaces of adjacent cells and thus separates said cells and provides an electrical connection between the same. Such a separator plate may take various forms and in the present instance the separator plates are circular in form and of a diameter somewhat greater than the width of the square cells. Each separator plate is provided with a central opening in line with the openings in the cells and adapted to receive a device, such as a bolt 16, by which the cells and separator plates may be firmly connected one with the other. The end cells of the two stacks of cells are electrically connected one to the other at the respective sides of the rectifier. Preferably the connecting elements extend across the end cells at the corresponding ends of the two stacks of cells and in the form here shown each connecting element comprises two substantially circular end plates 17 corresponding in thickness and diameter to the separator plates 15, and connected one with the other by a relatively narrow portion or neck 18. The circular portions 17 of the end members are provided with central openings to receive the bolts, or other devices, connecting the cells and plates of the respective stacks one with the other. Thus the tightening of the bolts draws the end plates, the separator plates and the cells into firm contact one with the other.

The rectifier may be supported in any suitable manner either with the stacks in horizontal positions or in vertical positions. The stacks are of a very compact arrangement which requires only a small mounting space and it is desirable that the mounting means shall be of such a character as to not appreciably increase the space required for mounting. As shown more particularly in Fig. 2 the mounting means comprises two brackets arranged on opposite sides of the rectifier and each having means whereby it may be connected with both stacks by the connecting bolts 16. In the arrangement shown each bracket comprises a bar or arm 19 extending across the space between the two stacks on the outer sides of the connector plates 17 and having adjacent its ends openings to receive the end portions of the bolts. Each bracket further includes an arm 20 extending downwardly from one end thereof and having at its lower end a laterally extending foot piece 21. The arm 20 for one bracket extends downwardly from the bolt of stack A and the arm for the other bracket extends downwardly from the bolt of stack B. The foot pieces of both brackets extend partly beneath the respective stacks but project outwardly beyond the same to provide space for an accessible screw or bolt 22. The fastening device or bolt 16 is insulated from both stacks and in the present arrangement a sleeve 23 of insulating material extends through the alined openings in the several plates and cells to receive the bolt 16 and insulate the same from the rectifier elements. Disks 24 of insulating material are mounted on the ends of the sleeves 23 and interposed between the bar 19 of each bracket and the end plates 17 of the two stacks.

The number and arrangement of the cells and of the separator plates depends in part upon the input and output voltages required. In the present instance there are ten rectifier cells in each stack which are so connected with the alternating current supply line and the direct current load circuit that the two halves of each cycle of the alternating current will flow in different paths through the rectifier to the load circuit and back through the rectifier to the alternating current supply line, both halves of the cycle traversing the same number of rectifier cells. In the preferred arrangement, and counting from top to bottom, the eight upper cells of stack A, as shown in Fig. 4, face upwardly, that is the selenium coating 12 is on the upper side of the plate 11 and the current flows upwardly. The two lower cells face downwardly and the current flows downwardly. In stack B the first and second of the upper cells, counting from the top, face downwardly and the other eight cells face upwardly. The separator plate 15 between the third and fourth cells of stack A is provided with a terminal 25 by which it may be connected with one side 26 of an alternating current supply line. The separator plate between the second and third cells of stack B is provided with a terminal 27 by which it may be connected with one side 28 of a direct current load circuit, the other or negative side of said load circuit, 29, being connected with a terminal 30 on the separator plate between the eighth and ninth cells of stack A. The other side 31 of the alternating current supply line is connected with a terminal 32 carried by the separator plate between the seventh and eighth cells of stack B. When alternating current is supplied to rectifier one-half of each cycle will flow from terminal 25 through the upper three cells of stack A, through the upper connecting member 17, thence through the two upper cells of stack B and terminal 27 to the output or load circuit, through load 33 to terminal 30, through two lower cells of stack A, through the lower connecting member 17 and through the three lower cells in stack B to terminal 32 and the other or negative side of the alternating current supply line. The other half cycle of the alternating current will flow from the side 31 of the supply line through terminal 32, the five intermediate cells of stack B to terminal 27 and the load circuit, 28 and 29, then through terminal 30 and through the five intermediate cells of stack A to the terminal 25 and side 26 of the alternating current supply line. As a result the two halves of each cycle of alternating current will flow through the rectifier in different paths to the load circuit and will flow through the load circuit in the same direction and will then be returned through different paths to the supply line, the paths traversed by the two half cycles being of substantially the same value.

In Figs. 6 and 7 there is shown a rectifier comprising a single stack of cells with the cells, heat storing separator plates and the end plates arranged substantially in the manner above described. In the particular arrangement here illustrated the stack comprises ten cells, 10a, which are circular in form and are spaced one from the other by separator plates 15a of a diameter slightly greater than the diameter of the cells, and at each end of the stack there is an end plate 17a. The cells and plates are rigidly connected one to the other by a bolt 16a, which is insulated in the manner above described. The stack is supported on brackets mounted on the opposite ends of the connecting bolt 16a and comprising upright arms 34 and feet 35 extending inwardly below the coil.

The cells 10a are divided into two groups by the central separator plate 36, the five cells above the plate 36 facing upwardly and the five cells below that plate facing downwardly, as shown in Fig. 7. The separator plate 36 is provided with a terminal 37 with which is connected one side 38 of the alternating current supply line. The upper end plate 17a is provided with a terminal 39 which is connected with one side of a load circuit 40, the other side 41 of which is connected directly with the other side 42 of the alternating current supply line. The lower end plate 17a is provided with a terminal 43 which is connected with one side of a second load circuit 44 the other side 45 of which is connected by a conductor 46 with the side 42 of the alternating current supply line. Thus the alternating current entering the rectifier at 37 is divided, one-half of each cycle flowing upwardly through the upper five cells to the load circuit and then back to the suply line through the exterior circuit 41. The other half of each cycle flows downwardly through the five lower cells to the terminal 43, through the load circuit 44—45 and then back to the supply line through the exterior circuit 46. The loads 40a and 45a may constitute separate parts of a single load, such as two windings of a solenoid.

While I have shown and described one embodiment of my invention I wish it to be understood that I do not desire to be limited to the details thereof as various modifications may occur to a person skilled in the art.

Having now fully described my invention, what I claim as new and desire to secure by Letters Patent is:

1. A rectifier of the selenium type comprising two stacks of rectifier cells, each stack including two groups of cells, the cells of the two groups facing in opposite directions and the cells in the corresponding groups in the two stacks facing in the same direction, means for electrically connecting the end cells of the two stacks one with the other, relatively thick heat storing conducting plates interposed between and having electrical contact with the adjacent cells in the respective stacks, each plate having a surface area approximating the surface area of the adjacent cells intermediate plates in corresponding groups in the two stacks having means for connecting therewith the respective sides of an alternating current supply line, the plates having contact with oppositely facing cells in the respective stacks having means for connecting therewith the respective sides of a load circuit.

2. A rectifier of the selenium type comprising two parallel stacks of rectifier cells, both stacks having the same number of cells, means for electrically connecting the adjacent end cells of the two stacks one with the other, the cells of each stack being divided into a relatively large group and a relatively small group, the two groups being arranged end to end and the cells of the two groups facing in opposite directions, the corresponding groups of cells being at opposite ends of the two stacks and facing in the same direction, means for connecting one side of an alternating current supply line with an intermediate cell in the large group in one stack, means for connecting the other side of said supply line with an intermediate cell in the large group of the other stack, means for connecting one side of a load circuit with the adjacent and oppositely facing cells of the two groups in the last mentioned stack, and means for connecting the other side of said load circuit with the adjacent and oppositely facing cells of the two groups in the first mentioned stack, the cells with which said supply line is connected being so located that the two halves of each cycle of alternating current will flow through the same number of cells and will flow successively and in the same direction through said load circuit.

3. A rectifier of the selenium type comprising two parallel stacks of rectifier cells, each stack including ten cells, means for electrically connecting adjacent end cells of the two stacks one with the other, the first stack having adjacent one end of said rectifier a group of eight cells facing said end of said rectifier and having adjacent the other end of said rectifier a group of two cells facing said other end of said rectifier, a second stack having adjacent the last mentioned end of said rectifier a group of eight cells facing in the same direction as the group of eight cells in the first stack, and having adjacent the first mentioned end of said rectifier, a group of two cells facing in the same direction as the two cells of said first stack, means for connecting one side of an alternating current supply line with the third cell of the eight cell group of the first stack, means for connecting the other side of said supply line with the third cell of the eight cell group of the second stack, means for connecting one side of a load circuit with the second cell of the two cell group and the eighth cell of the eight cell group of said second stack, and means for connecting the other side of said load circuit with the second cell of the two cell group and the eighth cell of the eight cell group of said first stack, whereby both halves of each cycle of alternating current will flow through said load circuit in the same direction and will flow through the same number of cells.

GEORGE H. LELAND.

REFERENCES CITED

The following references are of record in the file of this patent:

UNITED STATES PATENTS

| Number | Name | Date |
|---|---|---|
| 1,640,335 | Grondahl | Aug. 23, 1927 |
| 1,728,537 | Geiger | Sept. 17, 1929 |
| 1,862,936 | Lissman | June 14, 1932 |
| 1,905,703 | Harries | Apr. 25, 1933 |
| 2,083,647 | Gilson | June 15, 1937 |
| 2,349,629 | Lazich et al. | May 23, 1944 |
| 2,414,801 | Clarke | Jan. 28, 1947 |
| 2,437,322 | Hedding | Mar. 9, 1948 |
| 2,501,331 | Hein | Mar. 21, 1950 |
| 2,509,342 | Hedding et al. | May 30, 1950 |

FOREIGN PATENTS

| Number | Country | Date |
|---|---|---|
| 346,471 | Great Britain | Apr. 16, 1931 |